(12) United States Patent
Eschbach et al.

(10) Patent No.: US 7,801,068 B2
(45) Date of Patent: Sep. 21, 2010

(54) SELECTIVELY RECEIVING DATA IN A MULTICAST ENVIRONMENT

(75) Inventors: Jeffrey T. Eschbach, Hoffman Estates, IL (US); Kabe Vanderbaan, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 1116 days.

(21) Appl. No.: 11/025,611

(22) Filed: Dec. 29, 2004

(65) Prior Publication Data

US 2006/0140207 A1 Jun. 29, 2006

(51) Int. Cl.
*H04H 20/71* (2008.01)
*H04J 3/26* (2006.01)
*H04J 3/16* (2006.01)
*G06F 15/173* (2006.01)

(52) U.S. Cl. .................. 370/312; 370/432; 370/465; 709/223

(58) Field of Classification Search .................. 370/312, 370/431, 432, 468, 464, 465, 351, 389, 390; 709/223, 217, 219; 725/105
See application file for complete search history.

(56) References Cited

U.S. PATENT DOCUMENTS

| | | | |
|---|---|---|---|
| 6,039,624 A | 3/2000 | Holmes | |
| 6,298,058 B1 | 10/2001 | Maher et al. | |
| 6,449,491 B1 | 9/2002 | Dailey | |
| 6,597,680 B1 * | 7/2003 | Lindskog et al. | 370/347 |
| 6,628,625 B1 | 9/2003 | Birdwell et al. | |
| 6,785,254 B2 | 8/2004 | Korus et al. | |
| 7,035,657 B2 * | 4/2006 | Chen et al. | 455/419 |
| 7,061,880 B2 * | 6/2006 | Basilier | 370/349 |
| 7,158,488 B2 * | 1/2007 | Fujimori | 370/312 |
| 7,500,261 B1 * | 3/2009 | Myers | 725/105 |
| 2002/0093948 A1 | 7/2002 | Dertz et al. | |
| 2002/0184314 A1 | 12/2002 | Riise | |
| 2004/0022244 A1 * | 2/2004 | Boers et al. | 370/390 |
| 2004/0100983 A1 * | 5/2004 | Suzuki | 370/432 |
| 2004/0131075 A1 * | 7/2004 | Sinarajiah | 370/431 |
| 2004/0228300 A1 * | 11/2004 | Hester et al. | 370/329 |
| 2005/0076099 A1 * | 4/2005 | Wang et al. | 709/219 |
| 2005/0108419 A1 * | 5/2005 | Eubanks | 709/232 |

OTHER PUBLICATIONS

Holbrook, et al., Using IGMPv3 and MLDv2 for Source-Specific Multicast; Internet Article; Oct. 1, 2004, pp. 1-11.

(Continued)

*Primary Examiner*—Ricky Ngo
*Assistant Examiner*—Paul Masur
(74) *Attorney, Agent, or Firm*—Valerie M. Davis

(57) ABSTRACT

A controller (105) registers (205) a first number of channels; registers (210) a first number of clients (125); determines (215) a set of client groups a set of client groups and categorizing the registered clients into the client groups; and for each client group in the set, assigns (220) a corresponding subset of the registered channels; and communicates (225) the corresponding subset to each registered client therein. A RCD (125) registers (505) with the controller (105); and receives (510) a subset of the registered channels, the subset corresponding to a client group. In this manner, a RCD discovers a subset of channels in a network (130) to which it can subscribe that is appropriate for its resources and/or capabilities.

18 Claims, 5 Drawing Sheets

OTHER PUBLICATIONS

S. Deering; RFC 1112—Host Extensions for IP Multicasting; Network Working Group, Stanford University; Aug. 1989; pp. 1-13.
S. Bhattacharyya; RFC 3569—An Overview of Source-Specific Mutlicast (SSM); Network Working Group, Sprint; Jul. 2003; pp. 1-11.
PCT International Publication Dated Jul. 6, 2006.
Korean Office Action Dated Oct. 31, 2008.
Chinese Office Action Dated Dec. 12, 2008.
Chinese Office Action Dated Sep. 2, 2009.
Korean Office Action Dated Sep. 30, 2009.
Chinese Office Action Dated Apr. 1, 2010.

* cited by examiner

SELECTIVELY RECEIVING DATA IN A MULTICAST ENVIRONMENT

FIELD OF INVENTION

The invention relates to communication networks and more specifically to methods and apparatus for a host to discover and use selected channels for receiving data in a multicast environment.

BACKGROUND OF THE INVENTION

A Multimedia Intensive Collaborative Environment (hereinafter referred to as a MICE) is a broadband communication network that typically contains a plurality of host devices or hosts. A host is defined herein as a source when it transmits one or more feeds or streams of data (e.g., video data, audio data, etc.) within the MICE. A host is defined herein as a client when it receives one or more feeds transmitted by one or more sources within the MICE. Typically the MICE is an Internet Protocol (IP) enabled network, wherein the data is transmitted from the sources to the clients using the Internet Protocol as defined, for instance, in Internet Engineering Task Force (IETF) Request For Comment (RFC) 791 and RFC 2460. Moreover, in most networks the data may be of a high resolution (i.e., bandwidth intensive) and may be transmitted using either a unicast or a multicast method of transmission. Using the unicast method, a feed is transmitted by a specific source to a specific client. Whereas using the multicast method, feeds from one or more sources are sent to a "host group" (also referred to herein as a "multicast group") wherein each client that is a member of the host group receives all of the feeds transmitted to the host group.

Examples of MICEs include Access Grid Nodes, airport security systems with video surveillance, and public safety command-and-control multimedia systems. Typically the devices connected to the MICE comprise machines such as personal computers that have the necessary resources and/or capabilities to receive all of the feeds sent to a multicast group to which the machine is a member. However, to extend the functionality of the system, it may be desirable to introduce a device having more limited resources and/or capabilities (also referred to herein as a resource-constrained device or RCD). The limited resources and/or capabilities may result from, for instance, the RCD having reduced processing speed, available bandwidth, etc. or the RCD being limited to receiving one kind of data (e.g., only audio data). Examples of an RCD include, but are not limited to, a handheld device, a cellular telephone, a radio, a personal digital assistant (PDA), etc.

Due to the limited resources and/or capabilities of the RCD, there are some problems associated with introducing the RCD into the MICE. For example, if the RCD simply tried to join a multicast group, it may become overwhelmed by the bandwidth required to receive all of the feeds, or it may not have the capabilities to receive every kind of feed transmitted into the multicast group. There are some existing solutions that address the problems associated with the RCD receiving data sent to various multicast groups, but these solutions have several disadvantages.

One such solution involves upgrading the hardware resources on the RCD to enable the reception of all of the feeds available to the RCD. However, in many cases, this solution is impractical. For instance, a handheld device with these additional hardware resources may become too bulky to serve its purpose of being portable, and the upgrade may also be too costly. Moreover, as the resources available to a handheld device increase, in general so will the amount, type and bandwidth of the data being transmitted in the MICE. Therefore, resources of a handheld device will typically always lag behind the amount, type and bandwidth of the data available to the handheld, thereby potentially leading to the handheld becoming overwhelmed upon being connected within the MICE.

A second solution involves using a proxy or gateway device to redirect to one or more RCDs a subset of the feeds transmitted into one or more host groups. The subset will put a lower strain on the RCD. However, since all traffic is filtered through the proxy device, the proxy device introduces a single point of failure and may, moreover, become a bottleneck as the number of sources within the MICE increases. Furthermore, as the number of RCDs served by the proxy device increases, the complexity of the proxy device will typically correspondingly increase.

A third solution involves implementing a Source Specific Multicast (SSM) as defined, for instance, in IETF RFC 3569. With SSM, a client can request and receive data from selected sources in selected groups. More specifically, SSM provides a network layer service of a "channel" that is characterized by a source group (S, G) pair that identifies a source having a corresponding IP address and a group into which the source transmits one or more data streams, the group also having a corresponding IP address. A client can receive a source's feed(s) on a channel by subscribing to the channel's (S, G) pair. Channel subscription is supported by version three (3) of the Internet Group Management Protocol (IGMP) for IPv4 and version two (2) of the Multicast Linear Discovery (MLD) Protocol for IPv6, in accordance with, for instance, an IETF Internet Draft dated Oct. 1, 2004. However, RFC 3569 only provides for a partial solution in that it fails to address a particular methodology for a client to become aware of appropriate channels to which the client may subscribe.

Thus, what is needed is more effective methods and apparatus for a client in a multicast environment to discover and subscribe to selected channels in a network for receiving data. It is further desirable that the methods and apparatus be compatible with a source filtering protocol such as, for instance, SSM.

BRIEF DESCRIPTION OF THE DRAWINGS

A preferred embodiment of the invention is now described, by way of example only, with reference to the accompanying figures in which.

DETAILED DESCRIPTION OF THE INVENTION

Figure 1:
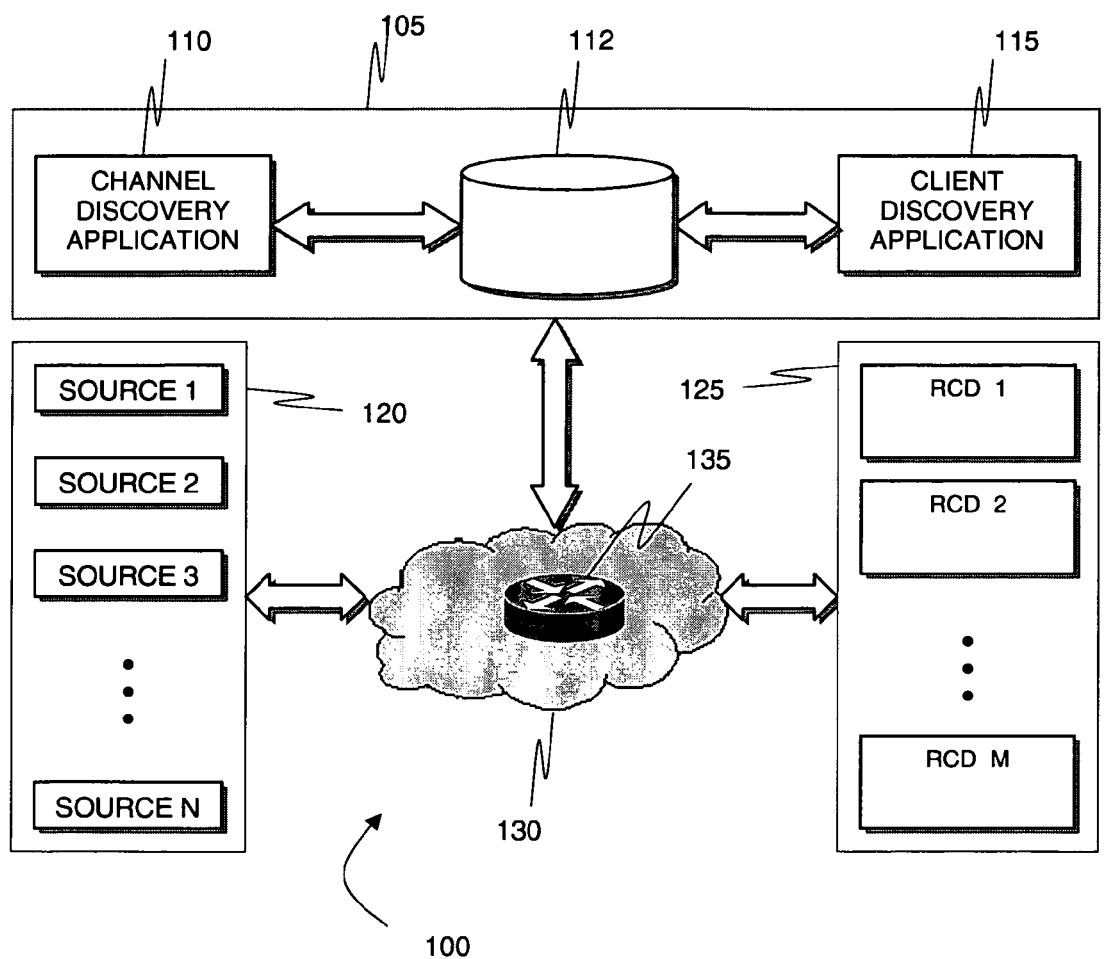
FIG. 1 illustrates a macro-level exemplary block diagram of a MICE in which may be implemented the various embodiments of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

Generally speaking, pursuant to these various embodiments, a controller in a network that may be a MICE, for example, employs dynamic functionality for creating and maintaining a set of client groups within which clients that register with the controller are categorized. The controller typically determines a set of parameters for each registered client during the registration process and uses those parameters to categorize the registered clients and to assign each client to an appropriate client group. The controller further dynamically registers, typically, a plurality of channels in the MICE and assigns a corresponding subset of the registered channels to each of the client groups. Each channel is characterized by a (S, G) pair that identifies a source "S" and a multicast group "G" into which the source transmits one or more streams of data. The controller may then communicate to each registered client in each client group the corresponding subset of registered channels assigned to that group. The controller may dynamically modify the client group(s) and/or the subset of registered channels associated with any of the client groups based on various factors.

Moreover, pursuant to these various embodiments a client who registers with the controller may, thereafter, have communicated to it a subset of the total number channels registered with the controller. The client then ideally uses an algorithm to determine which (if any) channels in the subset to subscribe. The client likewise employs a dynamic functionality to subscribe and unsubscribe to channels in the subset based on various factors and may also modify the subset based on input from the controller. In accordance with these various embodiments a RCD in a network that is a MICE, for instance, is afforded an effective mechanism for discovering channels that it may use for receiving data that is appropriate for the RCD's resources and capabilities.

The various embodiments of the present invention will be described below by reference to FIGS. 1-6. Those skilled in the art, however, will recognize and appreciate that the specifics of these illustrative examples are not specifics of the invention itself and that the teachings set forth herein are applicable in a variety of settings. For example, since the teachings do not depend on the type of data communication protocol, source filtering protocol (SFP) or source group filtering management protocol (SGFMP) used, they can be applied to any type of data communication protocol, SFP or SGFMP, although respectively IP, SSM and IGMPv3/MLDv2 is described in the embodiments. As such, alternative implementations using different types of data communication protocols, SFPs and SGFMPs are contemplated and are within the scope of the various teachings. In addition, since the teachings do not depend on the type of client used, they can by applied to any type of client, although RCDs are described in the embodiments. As such, alternative implementations using different types of clients are contemplated and are within the scope of the various teachings. Moreover, since the teachings do not depend on the type of source and controller used, they can be applied to any type of source or controller. As such, alternative implementations using different types of sources and controllers are contemplated and are within the scope of the various teachings.

In addition, much of the inventive functionality and many of the inventive principles are best implemented at the Application Layer and Network Layer of the OSI (Open System Interconnect) network model with or in software programs or instructions and related hardware. It is expected that one of ordinary skill in the art, when guided by the concepts and principles disclosed herein will be readily capable of generating such software instructions and programs, and hardware with minimal experimentation. Therefore, in the interest of brevity and minimization of any risk of obscuring the principles and concepts according to the present invention, further discussion of such software and hardware, if any, will be limited to the essentials with respect to the principles and concepts within the preferred embodiments.

Referring now to the drawings, and in particular to FIG. 1, a communication environment 100 in accordance with one embodiment of the present invention is shown and indicated generally at 100. Communication environment 100 is depicted as comprising a controller 105, a plurality of sources 120, e.g., Sources 1-N, and a plurality of clients 125. Controller 105, sources 120 and clients 125 are ideally configured for connecting to and communicating over a network 130, wherein data (which are also known and referred to in the art as packets, datagrams, feeds, streams, etc.) may be transmitted and received between any combination of the controller 105, sources 120 and clients 125 using, for example, a suitable Network Layer communication protocol such as, for instance, IP as described above. Moreover, environment 100 may be characterized as a MICE as it is desirable that multiple kinds of media (e.g., video, audio, etc.) will be transmitted over network 130, and this media will likely be transmitted pursuant to controlled bandwidth resources associated with network 130.

Also shown is a router 135 that may be any suitable apparatus having therein suitable hardware and software functionality for routing or directing the transmissions between the controller 105, sources 120 and clients 125 using IP. Only one router 135 is shown for the sake of clarity. However, skilled artisans will realized that a practical network 130 will include significantly more routers 135, the number of routers depending on the particular network 130 implementation. Also, those skilled in the art will realize that the number of hosts included in environment 100 will depend on a variety of factors including, but not limited to, the capacity of network 130, user or operator desire to be connected to network 130, etc.

Network 130 ideally supports IP multicasting, for example as described in RFC 1112, and the resulting creation of multicast groups for a more efficient transmission of data across network 130. Network 130 also ideally supports a SFP, such as SSM, and a corresponding SFGMP, such as IGMPv3 or MLDv2 depending on the version of IP used. These protocols support "source filtering", i.e., the ability of a host to express interest in receiving data packets sent only by specific sources or all but some specific sources in a given multicast group. Those of ordinary skill in the art will realize that protocols (both proprietary and standard) other than those identified above may also be implemented in network 130 without departing from the teachings herein.

Sources 120 may be any device having suitable hardware and software functionality for communicating over the network 130 in accordance with various embodiments of the present invention using those protocols supported by network 130. Moreover, ideally but not necessarily, sources 120 each contain sufficient resources and/or capabilities, e.g., adequate processing, bandwidth, and media capabilities for successfully receiving (i.e., without becoming overwhelmed) all of the feeds being transmitted into any multicast group that the source chooses to join. Accordingly, sources 120 may comprise, for example, any combination of laptop computers, desktop computers, servers, IP-based cameras and microphones, etc.

Likewise, clients 125 may be any device having suitable hardware and software functionality for communicating over the network 130 in accordance with various embodiments of the present invention using those protocols supported by network 130. However, clients 125 may not have sufficient resources and/or capabilities to successfully receive all of the feeds being transmitted into one or more multicast groups that the clients may desire to join. For example, a client may be a mobile or portable radio without a display suitable for showing video. A client may also be a cellular telephone or PDA, for instance, without sufficient processing and/or bandwidth capabilities for receiving all of the feeds in a given multicast group. Accordingly, clients 125 are herein interchangeably referred to as resource constrained devices or RCDs and illustrated as RCDs 1-M.

Controller 105 may be any device, such as for instance a server, having suitable hardware and software functionality for communicating over the network 130 in accordance with various embodiments of the present invention using those protocols supported by network 130. Controller 105 ideally comprises various Application Layer software, e.g. a channel discovery application 110 and a client discovery application 115, for implementing the various embodiment of the present invention as described in detail below. Controller 105 also ideally comprises one or more storage media, e.g. a database 112, for storing and maintaining various data in one or more predetermined formats in accordance with embodiments of the present invention. Skilled artisans will realize that the controller also comprises various other elements not shown for clarity of illustration including, but not limited to, suitable processing and storage devices (or media) for storing and implementing the above software applications. Moreover, those skilled in the art will realize that the controller may be implemented as a single device (as shown) or as multiple interactive devices having the necessary hardware and software functionality distributed between the multiple devices.

Figure 2:
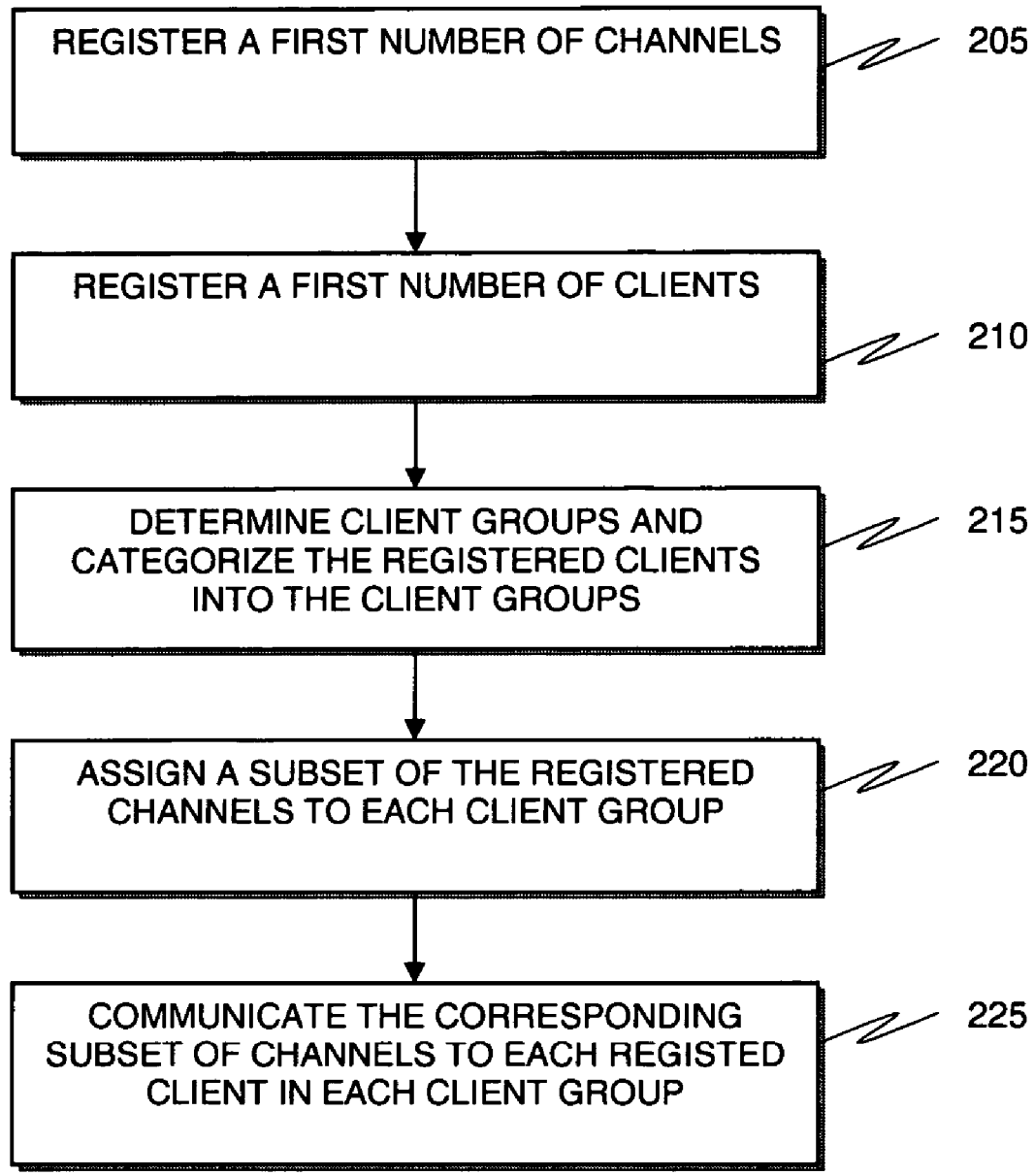
FIG. 2 is a flow diagram illustrating a method for use in a controller in accordance with an embodiment of the present invention.
Figure 3:
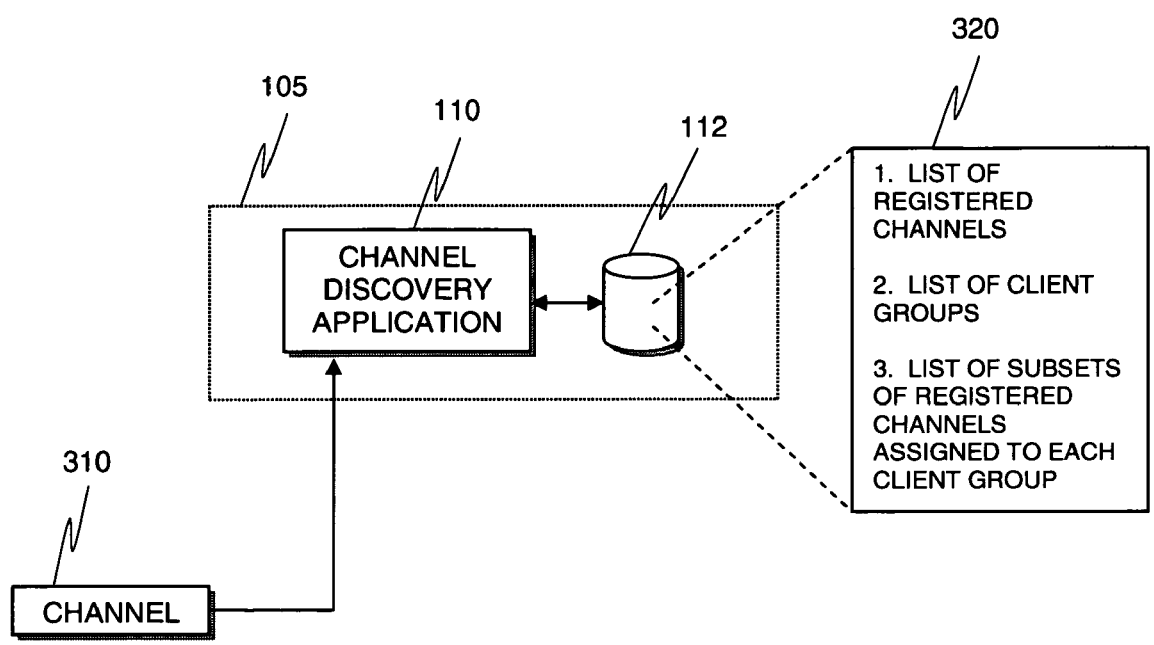
FIG. 3 illustrates is a macro-level exemplary block diagram of the controller discovering and registering a channel in the MICE in accordance with an embodiment of the present invention.
Figure 4:
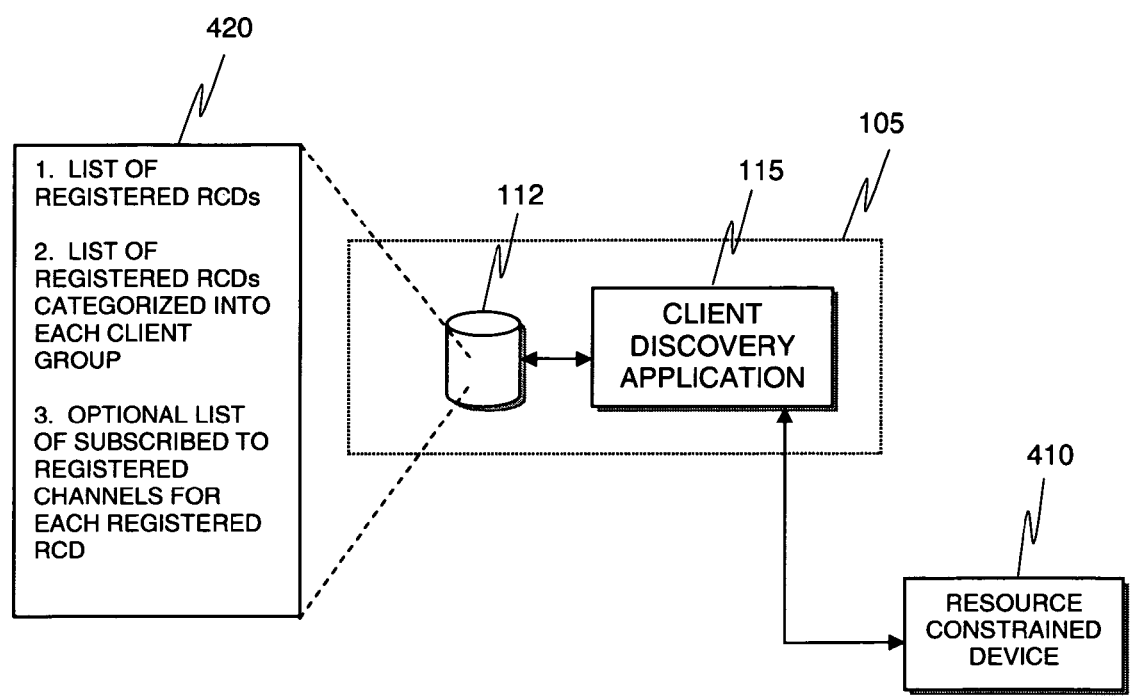
FIG. 4 illustrates a macro-level exemplary block diagram of the controller discovering and registering a RCD in the MICE in accordance with an embodiment of the present invention.

Turning now to FIG. 2, a plurality of steps that controller 105 performs in accordance with the various teachings herein is shown and generally indicated at steps 205-225. Ideally the controller 105 will implement steps 205-225 either manually through an operator or user for instance or using one or more software algorithms, including channel discovery application 110 and client discovery application 115, or any combination thereof of manual and software implementation. Moreover, ideally the controller 105 dynamically implements the steps either individually or in combination with any one or more other steps (either illustrated in FIG. 2 or otherwise described herein) and in any order necessary to implement the various teachings herein. In addition, the controller 105 ideally dynamically analyzes various factors, parameters, data and/or information, for example, in the environment 100 for implementing its algorithm(s), as explained in more detail below. FIGS. 3 and 4 aid in explaining one embodiment of how the controller may function and interact with the sources 120 and RCDs 125 (e.g., a RCD 410) for implementing the various teachings herein, including, but not limited to, those teachings described by reference to FIG. 2.

Controller 105 is configured for discovering and registering (205) one or more channels in network 100. A channel is defined generally as a path through which data can be transmitted. Each channel is characterized by a source group (S,G) pair that identifies a source "S" and a multicast group "G" into which the source transmits data. The data could be a single feed or multiple feeds of data. In accordance with SSM, the source is identified by an IP address and the multicast group is identified by a different IP address. A client would need to subscribe to a channel in order to receive the feed(s) from the source in the (S,G) pair that characterizes the channel.

Controller 105 may, for instance, use channel discovery application 110 for discovering and registering channels (e.g., a channel 310). Channel discovery application 110 could be any suitable proprietary or standard software that uses one or more procedures or algorithms for performing these functions. Channel discovery application 110 could, for example, use known IP addresses for sources or discover these IP addresses by using a services architecture such as JINI and then, for instance, use the "discovered" source IP addresses to obtain the relevant channel information directly from the sources using standard IP. Also, channel discovery application 110 could discover channels through one or more lists, look-up tables, and databases individually or in any combination thereof maintained by a separate device in the network 130. In addition, the channel discovery application 110 could discover the channels by discovering the multicast groups in session in the network 130 (through normal multicasting methodologies) and then determine the sources that are transmitting into each of those multicast groups. Moreover, the sources could have a priori knowledge of an interface to the channel discovery application 110 and communicate to it valid channels, or the channel discovery application 110 could have a priori knowledge of the channels in network 130, or the channel discovery application 110 could have a priori knowledge of possible channels in network 130 and poll the sources to determine which of the possible channels are valid.

Once a channel is discovered and registered, the channel discovery application 110 would ideally store and maintain the registered channel information in a suitable format, for instance in a list 320 format on database 112. Controller 105 would then ideally dynamically maintain and update/modify the list of registered channels based on one or more factors or parameters. Those factors or parameters could include, but are not limited to, a new channel being registered with controller 105 (wherein the list of registered channels would be updated to include the newly registered channel) and a registered channel becoming deregistered from controller 105 (wherein the list of registered channels would be updated to delete the deregistered channel).

Skilled artisans will realize and appreciate that there are various reasons a channel might become deregistered from the controller 105 that may include, for example, a source directly notifying the controller 105 that a channel into which it was transmitting is no longer valid, or the controller 105 determining that is channel is no longer valid based on updates from one or more lists, look-up tables, databases individually or in any combination thereof maintained by a separate device in the network 130. The controller 105 might, alternatively or in addition thereto, use a suitable timeout/ keep-alive mechanism, wherein a channel would be deregistered if it were not refreshed with the controller within a predetermined time period (e.g., prior to a given timer timing out). Those of ordinary skill in the art will further realize that the above-described means for channel discovery and registration are merely exemplary and that other means are within the scope of the various teachings herein.

In a similar manner, controller 105 is configured for discovering and registering (210) one or more clients or RCDs in network 130. Controller 105 may, for instance, use client discovery application 115 for discovering and registering RCDs (e.g., a RCD 410). Client discovery application 115 could be any suitable proprietary or standard software that uses one or more procedures or algorithms for performing these functions. Client discovery application 115 could, for example, use known IP addresses for RCDs or discover these IP addresses by using a services architecture such as JINI, and then, for instance, use the "discovered" RCD IP addresses in another predetermined procedure for registering each RCD. Also, client discovery application could discover clients through one or more lists, look-up tables, and databases individually or in any combination thereof maintained by a separate device in the network 130. In addition, a RCD could have a priori knowledge of the controller 105 and itself seek to register with the controller.

Once an RCD is discovered and registered, the client discovery application 115 would ideally store and maintain the registered client information in a suitable format, for instance in a list 420 format in database 112. Controller 105 would then ideally dynamically maintain and update/modify the list of registered clients based on one or more factors or parameters. Those factors or parameters could include, but are not limited to, a new RCD being registered with controller 105 (wherein the list of registered RCDs would be updated to include the newly registered RCD) and a registered RCD becoming deregistered from controller 105 (wherein the list of registered RCDs would be updated to delete the deregistered RCD).

Skilled artisans will realize and appreciate that there are various reasons a RCD might become deregistered from the controller 105 that include, for example, a RCD requesting to be deregistered from the controller 105, or the controller 105 determining that a RCD is no longer connected to network 130 based on updates from one or more lists, look-up tables, and databases individually or in any combination thereof maintained by a separate device in the network 130. The controller 105 might, alternatively or in addition thereto, use a suitable timeout/keep-alive mechanism, wherein a RCD would be deregistered if it were not refreshed with the controller within a predetermined time period (e.g., prior to a given timer timing out). Those of ordinary skill in the art will further realize that the above-described means for client discovery and registration are merely exemplary and that other means are within the scope of the various teachings herein.

Controller 105 is also configured for determining (215), ideally using one or more software algorithms, a set of client groups and categorizing the registered clients into the client groups. For example, the set of clients groups or a portion thereof could be determined a priori to any RCDs registering with the controller 105, wherein upon registering the controller 105 would ideally categorize each RCD into one of the client groups. Thus, there may be times when one or more client groups in the set contains no registered clients if, for example, no RCDs have registered that the controller 105 would place in a given client group. The set of client groups or a portion thereof could also be dynamically determined and/or modified (and each RCD added to or removed from a client group) as each RCD registers or deregisters with the controller 105.

In one implementation (albeit not the most efficient implementation), a separate client group could be created for each registered RCD and correspondingly deleted upon a RCD deregistering from the controller 105. Thus, there may be times when the set of client groups contains no client groups if, for example, no RCDs are registered with the controller 105. In another implementation, the set of client groups could be determined based upon the expected types of RCDs that the controller anticipates registering (e.g., a client group for PDAs, a client group for cellular telephones, a client group for radios, etc.).

In a further implementation, the determination of the client groups could be based on a set of parameters such as resources and/or capabilities of the RCDs that may include, but are not limited to, audio, video, bandwidth and processing capabilities of the registered RCDs (or those resources and/or capabilities that the controller 105 anticipates will be present in the RCDs). Accordingly, during the process of registering each RCD, the controller 105 might determine a set of parameters corresponding to each registered RCD for categorizing each RCD into a client group, the set of parameters including, but not limited to, audio, video, bandwidth and processing capabilities. The controller 105 may determine this set of RCD parameters using various information including, but not limited to, information from the RCD regarding what type of device it is or the RCD specifically identifying its resources and/or capabilities.

Controller 105 would ideally store and maintain information regarding the set of client groups and the registered RCDs categorized therein is a suitable format, for instance in a list 320, 420 format on database 112. Controller 105 would then ideally dynamically maintain and update/modify the list(s) of client groups and of registered RCDs categorized into each client group based on one or more factors or parameters including, but not limited to, those discussed above.

Controller 105 is also ideally configured with one or more algorithms for assigning (220) a subset of the registered channels to each client group in the set of client groups, the information regarding which the controller may store and maintain in a predetermined format, such as a list 320 format in the database 112. This algorithm is also ideally dynamically implemented so that the controller assigns to and maintains a corresponding set of channels that is appropriate for a given client group so that the registered RCDs that are categorized in that client group would receive (by subscribing to one or more i.e., a portion of, the channels in the set) only those feeds that are appropriate for the resources and capabilities of those RCDs.

Accordingly, the controller 105 may dynamically modify the subset of registered channels corresponding to any of the client groups based upon a set of parameters including, but not limited to: registering a new channel that should be added to one or more subsets of the registered channels; deregistering a registered channel that should be removed from one or more subsets of the registered channels; the controller 105 analyzing data (e.g., one or more data feeds) transmitted on the channels in any of the subsets of the registered channels; the controller 105 determining a change in the capabilities of one or more of the registered clients; and input from an operator or user of the controller 105 who may, for example, manually cause the controller to modify any one or more of the subsets of the registered channels.

It should be further realized by those skilled in the art that in some instances there may be a subset of zero registered channels assigned to one or more client groups, for example, where there are no registered channels (for instance when there are no sources in network 130) or when based upon the set of parameters as discussed above, the controller 105 determines that there are no registered channels that are appropriate for the resources and/or capabilities of the registered RCDs in a given client group.

For each client group that has a corresponding assigned subset of the registered channels, the controller 105 communicates this subset to each of the registered RCDs categorized in the client group. The controller 105 likewise communicates to each registered RCD in each client group any updates or modifications to the corresponding subset of the registered channels either by communicating the entire modified subset or by communicating only the changes to the subset already stored in the registered RCD (e.g., the addition or deletion of one or more channels to the subset). Thus in according to these various embodiments, a registered RCD will become aware only of those channels in network 130 that are appropriate for the registered RCD to subscribe. Additionally, the resources and/or capabilities of the registered clients may also change (e.g., the bandwidth available to a registered device could change over time as it moves around), and could be detected by the controller (e.g., when the client communicates the changes back to it) to dynamically re-assign a registered client into different client groups. Accordingly, the controller 105 would communicate to a re-categorized client the new corresponding assigned subset of the registered channels (or updates to the set of channels already stored in the RCD).

Figure 5:
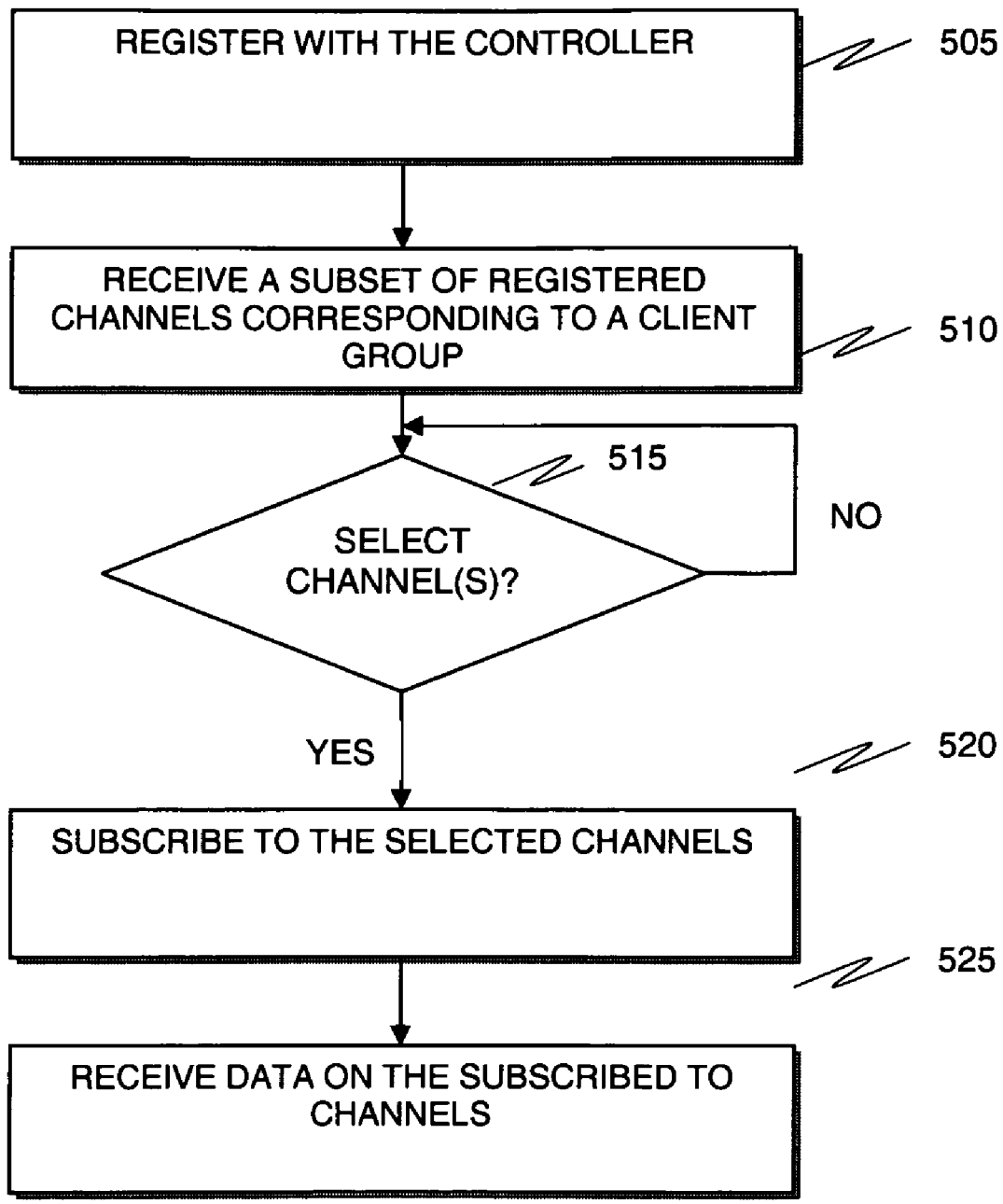
FIG. 5 is a flow diagram illustrating a method for use in an RCD in accordance with an embodiment of the present invention.

Turning now to FIG. 5, a plurality of steps that a RCD, e.g., RCD 410, performs in accordance with the various teachings herein is shown and generally indicated at steps 505-525. Ideally RCD 410 will implement steps 505-525 either manually through an operator or user for instance or using one or more software algorithms, or any combination thereof of manual and software implementation. Moreover, ideally the RCD 410 dynamically implements the steps either individually or in combination with any one or more other steps (either illustrated in FIG. 5 or otherwise described herein) and in any order necessary to implement the various teachings herein. In addition, RCD 410 ideally dynamically analyzes various factors, parameters, data and/or information, for example, in the environment 100 for implementing its algorithm(s), as explained in more detail below. FIG. 4 aids in explaining one embodiment of how RCD 410, for example, functions and interacts with the controller 105 for implementing the various teachings herein, including, but not limited to, those teachings described by reference to FIG. 5.

In accordance with the various embodiments of the present invention, a RCD 410 may register (505) with the controller 105, for example, using the mechanisms described above. In response to this registration the RCD 410 will receive (510) a subset of the channels registered with the controller 105 (including a subset having zero channels), wherein the subset corresponds to a given client group. RCD 410 may also receive, from time to time, updates to the subset of channels as described above. Ideally, RCD 410 stores and maintains its subset of the registered channels in a suitable predetermined format in a suitable storage device such as a Random Access Memory included in the RCD. Ideally, RCD 410 also updates/modifies its subset of the registered channels based upon updates received from the controller 105.

The RCD 410 further ideally implements one or more algorithms for determining which (if any) of the channels in its subset to subscribe. For example, the algorithm may be a simple algorithm that instructs the RCD to join or subscribe to all of the channels in its subset. Alternatively, the algorithm may be more complex and dynamic in that it might take into consideration various criteria including, but not limited to, input from a user or operator of the RCD, information from the controller based on an analysis of the feeds transmitted on the channels, etc., in determining whether the RCD will join all, none or a portion of the channels in its subset.

Where RCD 410 selects (515), through its algorithm(s) at least a portion of the channels in its subset of the registered channels, RCD 410 may use any suitable SFGMP to subscribe (520) to the selected channels. For example, RCD 410 may use IGMPv3 or MLDv2 to specify to a router, e.g. router 135, a channel address (i.e. the (S, G) pair) for each of the selected channels. Router 135 may then use SSM to obtain and forward the feeds on those selected channels for receipt (525) by RCD 410.

RCD 410 may, similarly, unsubscribe to one or more subscribed to channels using IGMPv3 or MLDv2 to specify to router 135 a channel address for each of the deselected channels. RCD 410 may unsubscribe to one or more channels based upon a number of factors including, but not limited to, results from its algorithm, input from a user or operator of the RCD, information from the controller based on an analysis of the feeds transmitted on the channels, receiving an update from the controller 105 removing a portion or all of the channels (including subscribed to channels) from the RCD's subset of the registered channels, etc. It should be noted that in certain implementations the controller 105 (automatically or manually through a user or operator of the controller, for instance) may force the RCD to unsubscribe to all channels by removing all of the channels from the RCD's subset and communicating a nil subset to the RCD, especially where the controller by any suitable method becomes aware that the RCD implements an algorithm of join all.

Finally, RCD 410 may optionally communicate to the controller 105 information regarding whether it has subscribed to at least one registered channel. This information may include, for instance, notifying the controller that it has not subscribed to any channels, that it has subscribed to one or more channels (including the identity of those channels), and modifications to its subscribed to channels. For example, if the RCD was registered to one channel, and then unsubscribed (such that it is now subscribed to no registered channels), the RCD would communicate to the controller that it has unsubscribed to the channel so that the controller knows that it is no longer subscribed to any channels. The controller may further, optionally maintain for RCD 410 (and ideally for all of the registered RCDs) this information in a predetermined format, such as a list (420) format in database 112.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for use in a multicast environment comprising the steps of:

at a controller device:

registering a plurality of channels each used to communicate at least one data feed to a multicast group;

registering a plurality of clients, wherein the registering includes determining a set of parameters for each client;
determining a plurality of client groups based on the set of parameters of each client, and for each client group assigning a subset of the registered channels;
for each registered client and using the parameters determined during the registering, categorizing the registered client into one of the client groups and communicating to the registered client the subset of registered channels assigned to the client group, wherein the subset of registered channels communicated to the registered client include only those data feeds that the registered client has at least one of resources or capabilities to receive;
detecting a modification of the set of parameters for at least one registered client;
determining whether to re-categorize the at least one registered client into a different client group; and
upon re-categorizing the at least one registered client, communicating an updated corresponding assigned subset of the registered channels.

2. The method of claim 1, wherein the set of parameters includes at least one of audio, video, bandwidth and processing capabilities of the registered client.

3. The method of claim 1 further comprising modifying the corresponding subset of the registered channels for at least one client group based on a set of parameters and communicating the modifications to the subset to each client in the corresponding client group.

4. The method of claim 3, wherein the set of parameters includes at least one of: registering a new channel; deregistering a registered channel; receiving at least one input from at least one operator; analyzing data transmitted on at least one registered channel.

5. The method of claim 1 further comprising the step of modifying the set of client groups.

6. The method of claim 5 further comprising at least one of:
the step of deregistering at least one registered client, wherein the set of client groups is modified by at least one of removing the at least one deregistered client from at least one client group and deleting a client group in which the deregistered client was categorized; and
the step of registering at least one new client, wherein the set of client groups is modified by at least one of adding the at least one deregistered client to at least one client group and adding a client group in which the deregistered client is categorized.

7. The method of claim 1, wherein each registered channel is characterized by a source group (S, G) pair that identifies a source and a multicast group into which the source transmits.

8. The method of claim 7, wherein the (S, G) pair is based on a Source Specific Multicast (SSM) protocol, wherein the source in the (S, G) pair is characterized by a first interne protocol (IP) address and the group in the (S, G) pair is characterized by a second IP address.

9. The method of claim 1 further comprising the steps of:
for each registered client,
receiving information identifying whether the registered client has subscribed to at least one registered channel; and
maintaining the information in a predetermined format.

10. The method of claim 9, wherein each registered channel is characterized by a source group (S, G) pair that identifies a source and a multicast group into which the source transmits.

11. The method of claim 10, wherein the (S, G) pair is based on a Source Specific Multicast (SSM) protocol, wherein the source in the (S, G) pair is characterized by a first internet protocol (IP) address and the group in the (S, G) pair is characterized by a second IP address.

12. The method of claim 9 further comprising the step of modifying the subset of the registered channels.

13. A method for use in a client in a multicast environment that includes a controller having registered a plurality of channels each used to communicate at least one data feed to a multicast group, the method comprising the steps of:
at the client:
registering with the controller, wherein the registering includes determining a set of parameters for the client;
responsive to registering, receiving a subset of the registered channels, wherein the subset was assigned by the controller to a client group into which the client was categorized by the controller using the set of parameters for the client, wherein the subset of registered channels received by the client include only those data feeds that the client has at least one of resources or capabilities to receive,
wherein the set of parameters for the client is modified,
wherein the client is re-categorized into a different client group; and
based upon being re-categorized into the different group, receiving an updated corresponding assigned subset of the registered channels.

14. The method of claim 13 further comprising the steps of:
determining whether to select at least a portion of the registered channels in the subset;
subscribing to each selected channel; and
receiving data on each subscribed to channel.

15. The method of claim 14, wherein a source filtering group management protocol (SFGMP) is used to subscribe to each selected channel and to unsubscribe from a subscribed to channel.

16. The method of claim 15, wherein the SFGMP is one of an Internet Group Management Protocol and a Multicast Listener Discovery Protocol.

17. The method of claim 14 further comprising the step of communicating to the controller information identifying whether at least one registered channel in the subset has been subscribed to.

18. A controller configured for performing a method comprising the steps of:
registering a plurality of channels each used to communicate at least one data feed to a multicast group;
registering a plurality of clients, wherein the registering includes determining a set of parameters for each client;
determining a plurality of client groups based on the set of parameters of each client, and for each client group assigning a subset of the registered channels;
for each registered client and using the parameters determined during the registering, categorizing the registered client into the client groups and communicating to the registered client the subset of registered channels assigned to the client group, wherein the subset of registered channels communicated to the registered client include only those data feeds that the registered client has at least one of resources or capabilities to receive:
detecting a modification of the set of parameters for at least one registered client;
determining whether to re-categorize the at least one registered client into a different client group; and
upon re-categorizing the at least one registered client, communicating an updated corresponding assigned subset of the registered channels.

* * * * *

UNITED STATES PATENT AND TRADEMARK OFFICE
CERTIFICATE OF CORRECTION

PATENT NO.       : 7,801,068 B2
APPLICATION NO.  : 11/025611
DATED            : September 21, 2010
INVENTOR(S)      : Eschbach et al.

Page 1 of 1

It is certified that error appears in the above-identified patent and that said Letters Patent is hereby corrected as shown below:

On Page 2, in Field (56), under "OTHER PUBLICATIONS", in Column 1, Line 4, delete "Mutlicast" and insert -- Multicast --, therefor.

In Column 11, Line 52, in Claim 8, delete "interne" and insert -- internet --, therefor.

Signed and Sealed this
Seventh Day of August, 2012

David J. Kappos
*Director of the United States Patent and Trademark Office*